April 23, 1929.  E. RICHARDSON  1,710,649
VARIABLE SPEED AND REVERSING GEARING
Filed Jan. 30, 1929  2 Sheets-Sheet 2

Inventor
Eric Richardson.
per H.T.T. Gee
Attorney.

Patented Apr. 23, 1929.

1,710,649

UNITED STATES PATENT OFFICE.

ERIC RICHARDSON, OF NORTHAMPTON, ENGLAND.

VARIABLE-SPEED AND REVERSING GEARING.

Application filed January 30, 1929, Serial No. 336,295, and in Great Britain June 16, 1927.

This invention relates to improvements in variable speed and reversing gearing as described and illustrated in my application Serial No. 282,337 filed 2nd June, 1928, and for which this application is a substitute and has for its object to provide a simple and efficient gear of the epicyclic type.

According to this invention, the driving shaft is provided with a pinion which through planet wheels conveniently carried by a cage is arranged to drive an outer annular ring secured to the driven shaft, the variation of speed being obtained by controlling the reciprocation of pistons driven by the driving shaft in cylinders connected to the planet wheel cage.

The reverse gear is obtained by locking the planet wheel cage against motion.

In order that this invention may be the more clearly understood and readily carried into effect, I will proceed to describe the same with reference to the accompanying drawings which illustrate by way of example and not of limitation one convenient embodiment of this invention and in which Figure 1 is a longitudinal section through the gear.

Figure 1:
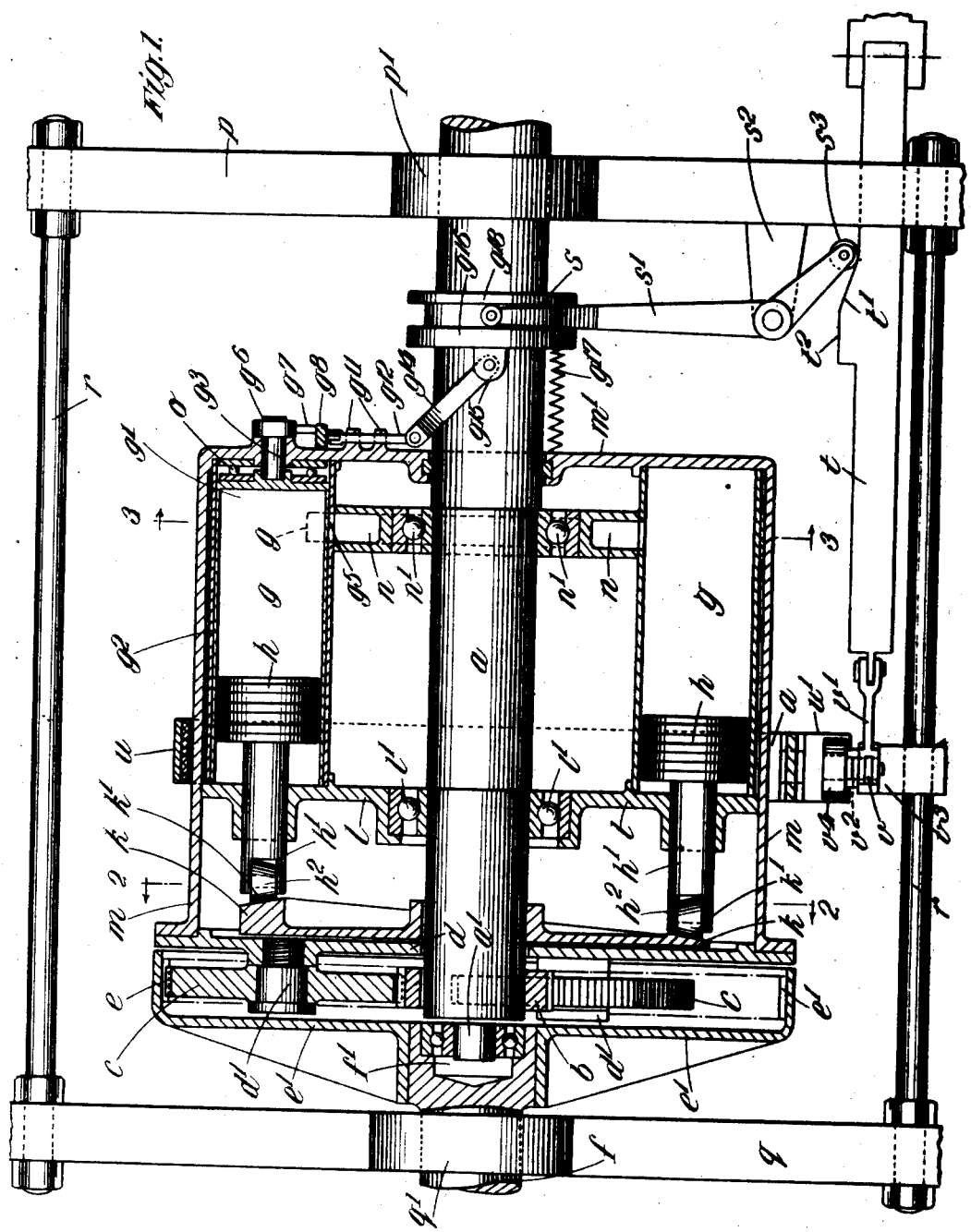
Figure 2:
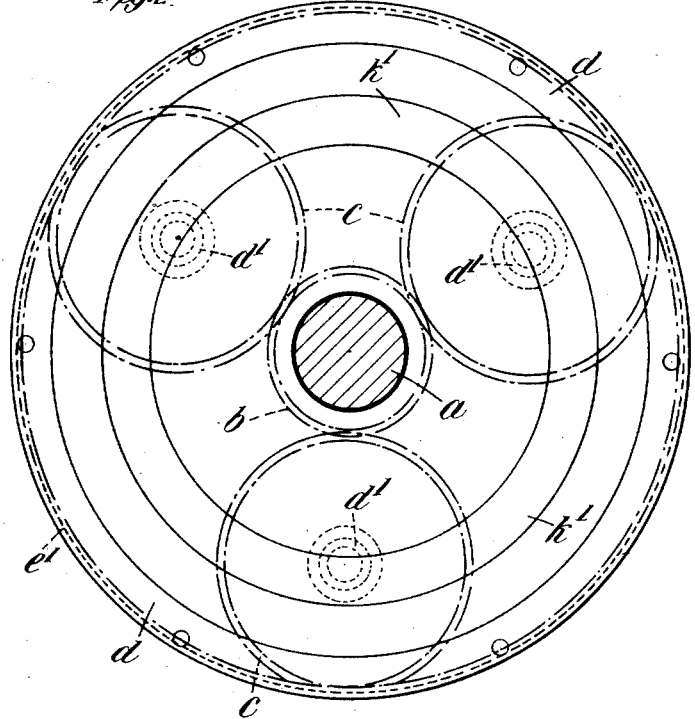
Figure 2 is a section on line 2—2 of Figure 1 with the drum removed.

Referring to the drawings, the driving shaft $a$ is provided with a pinion $b$ in mesh with three planet wheels $c$ carried by a cage or the like $d$, the said planet wheels $c$ also meshing with the internally toothed periphery $e$ of a cup-shaped member $e^1$ secured to or formed integrally with the driven shaft $f$. The driven shaft is conveniently hollow as at $f^1$ at the end of which the cup-shaped member $e^1$ is secured in order to accommodate and form a bearing for the reduced end $a^1$ of the driving shaft $a$ which projects into the same as shown in Figure 1.

The cage $d$ for the planet wheels $c$ may comprise two plates one arranged at the base of the cup-shaped member and the other arranged at the mouth thereof, the said planet wheels $c$ being rotatably mounted on spindles $d^1$ which are carried by the plates. The planet wheel cage $d$ also carries two cylinders $g$ the pistons $h$ of which are operated by a cam $k$ secured to the driving shaft. If desired, a further plate $l$ attached to the cylinders may be journalled around the driving shaft on the side remote from the planet wheel cage, the piston rods $h^1$ sliding in this plate $l$ which is provided at its centre with a ball race $l^1$ to allow the driving shaft $a$ to revolve freely.

The cylinders $g$ are carried by a drum $m$ which is secured to the planet wheel cage.

The piston rods $h^1$ are provided at their ends with rollers $h^2$ which bear on the cam $k$ so as to be operated therefrom upon rotation of the driving shaft $a$. The cam $k$ is in the form of a ring which, as shown in Figure 1, is keyed or otherwise suitably secured to the driving shaft $a$. The face of the cam $k$ is sloped outwardly as shown at $k^1$ and the rollers $h^2$ at the ends of the piston rods $h^1$ are also coned to this angle. The inclination of the surface $k^1$ should be so arranged that the number of revolutions made by the larger diameter end of the roller $h^2$ in travelling around its circuit of travel is exactly equal to the number of revolutions made by the end of smaller diameter in travelling around its circuit of travel. If the surface $k^1$ were not coned in the manner described and shown, the distance travelled by the outer ends of the rollers $h^2$ would be greater than the distance travelled by the inner ends of the said rollers and hence a considerable slip would occur which is, of course, undesirable.

Figure 3:
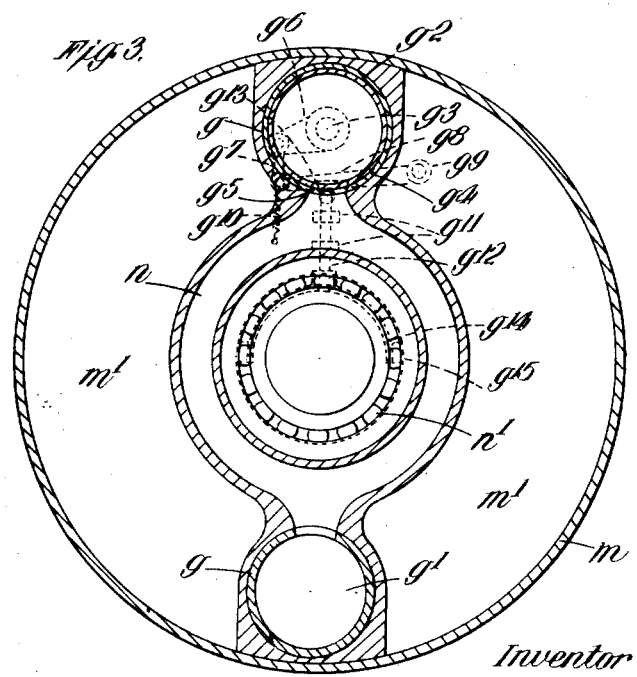
Figure 3 is a section on line 3—3 of Figure 1.

The heads $g^1$ of the cylinders $g$ are connected by a connecting pipe $n$ which is preferably of large diameter as shown in order to reduce to a minimum resistance to the flow of liquid with which the cylinders and communicating pipe are filled. A certain initial pressure is given to this liquid by screwing up a filling plug in order to maintain contact pressure of the piston rod rollers on the cam surface. The said connecting pipe $n$ branches on either side of the driving shaft $a$ as shown in Figure 3 and at the centre is provided with a ball race $n^1$ journalled about the driving shaft $a$. Thus by branching the connecting pipe to either side of the driving shaft $a$ not only is the balance maintained but in addition a further bearing is provided for the engine shaft. A valve of any suitable form is provided to control the flow of liquid which is pumped backwards and forwards by the reciprocation of the pistons. I have found one convenient form of valve to comprise a sleeve $g^2$ arranged inside one of the cylinders $g$ so that the piston $h$ reciprocates in the sleeve $g^2$ and not actually in the cylinder $g$. This sleeve $g^2$ is provided at its head with a spindle $g^3$ which passes through the head $g^1$ of the cylinder $g$ and the head $m^1$ of the drum $m$. A thrust ball bearing $o$ is arranged between the head of the sleeve $g^2$ and the head $g^1$ of the cylinder $g$.

The sleeve $g^2$ is ported as at $g^4$ so that by rotating the sleeve $g^2$ within the cylinder $g$ the port $g^4$ can be made to register with the port $g^5$ in the cylinder wall whereby the flow of oil from one cylinder to the other is controlled.

The device is mounted between two bearers $p$ and $q$ which are carried by the chassis of the car or the like to which the gear is fixed. Bolts $r$ are arranged between the two bearers for a purpose hereinafter referred to. The driving shaft $a$ is journalled in the bearer $p$ as shown at $p^1$ while the driven shaft is journalled in the bearer $q$ as at $q^1$.

The means for rotating the sleeve $g^2$ within the cylinder $g$ comprises an arm $g^6$ secured to the spindle $g^3$ the said arm being connected by a link $g^7$ with an arm $g^8$ pivoted at $g^9$ on the drum $m$. A tension spring $g^{10}$ bears on the arm $g^8$ and tends to move the same in a direction to close the valve. Brackets $g^{11}$ are provided on the drum $m$ within which is slidably mounted a rod $g^{12}$ having at its upper end a roller $g^{13}$ bearing on the arm $g^8$. Pivotally mounted on the bottom of the rod $g^{12}$ is a stirrup $g^{14}$ the ends of which are freely mounted in lugs $g^{15}$ outstanding from a plate $g^{16}$ freely mounted on the driving shaft $a$. Compression springs $g^{17}$ arranged one on each side of the driving shaft $a$ tend to cause the plate $g^{16}$ to move away from the drum $m$. The plate $g^{16}$ is provided with an annular groove $g^{18}$ to receive the forked end $s$ of a somewhat bell crank shaped lever $s^1$ pivoted in brackets $s^2$ on the bearer $p$, the free end of the bell crank lever $s^1$ being provided with a roller $s^3$.

Slidably arranged in the bearers $p$, $q$ is a bar $t$ connected to the operating rod or pedal so as to be moved backwardly and forwardly therewith. This rod $t$ is provided with a cam surface $t^1$ adapted to engage the roller $s^3$ on the bell crank lever $s^1$. When, therefore, the bar $t$ is moved to the right as shown on the drawings, the bell crank lever $s^1$ will be operated to cause the plate $g^{18}$ to approach the drum $m$. In doing so, of course, it will raise the arm $g^8$ due to the flattening out of the parts $g^{12}$, $g^{14}$. Movement of the arm $g^8$ will, of course, be transferred to the spindle $g^3$ as rotation due to the link $g^7$ and lever $g$. In this manner movement of the operating lever or pedal is caused to rotate the sleeve and so open and close the ports whereby giving rise to the different speeds as will be readily understood.

The length of the cam surface $t^1$ is such that in travelling up the whole of this surface, the sleeve $g^2$ is rotated from the full "closed" to the full "open" position and after riding up the cam surface $t^1$ the roller $s^3$ engages with a flat portion $t^2$ for a purpose hereinafter described.

Describing now the operation of the device, with the valve full open the pistons will be able to reciprocate backwards and forwards freely and hence since there is a certain load on the driven shaft tending to prevent rotation of the same, the driving pinion will drive the planet wheels round and as there is nothing to prevent the cage moving, the planet wheels will run idly around the internal toothed periphery of the cup-shaped member. When the lever is in its normal position the valve is fully closed, (see Figure 1), and it will be impossible for the pistons to reciprocate. This will necessitate the cage, and hence the pinions, moving as a unit with the driving shaft. In this case on account of the teeth of the planet wheels engaging with the internal toothed periphery of the cup-shaped member, the whole of the gear will be locked and it will give a direct drive. Between these two extremes the cage will be allowed varying amounts of movement with respect to the driving pinion due to the variation of the setting of the valve which will give rise to various speeds of transmissions as will be readily understood.

The cylinder drum $m$ comprises a brake surface the arrangement being such that by actuating the gear operating lever beyond the full open position of the valve, a band or other suitable brake $u$ is caused to be applied to the cylinder drum $m$ which will thus hold the planet wheel cage against rotation. Rotation of the driving pinion in one direction will then cause the cup-shaped member to revolve in the opposite direction and so give reverse motion. The band brake may be applied gradually and this of course will give various ratios for the reverse transmission.

One suitable method of causing continued movement of the operating lever to give the reverse is shown in the accompanying drawings and it is for this purpose that the surface $t^2$ is provided on the bar $t$. Continued movement of the lever beyond the full "open" position will cause the roller $s^3$ to engage with the surface $t^2$ so that the ports will be kept open. The bar $t$ extends rearwardly beyond the cam surface $t^1$ and is connected by a link $v^1$ to a rod $v$ outstanding from a spindle $v^2$ journalled in a bearing $v^3$ carried by one of the bolts $r$. The spindle $v^2$ is provided at its upper end with a thin cam $v^4$ so that in rotating the cam $v^4$ is caused to act on the free ends $u^1$ of the external contracting band brake (which ends are crossed) in order to separate the ends and so apply the brake. The cam $v^4$ is, however, so shaped that while the roller $s^3$ is riding up the surface $t^1$ it does not come into action but while the roller $s^3$ is in engagement with the surface $t^2$ it engages and applies the band brake.

If desired, a separate control lever may be provided for the reverse.

The whole gear is preferably enclosed within an oil-tight gear box casing which is filled with oil so that the gear always runs in oil and will be adequately lubricated.

In this case the enclosing of the cylinders in the cylinder drum will also prevent the revolving cylinders thrashing the oil in the gear box.

Any suitable fluid may be employed as the controlling mechanism, for example, I have found glycerine or oil to be satisfactory.

I claim:—

1. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, an annular cam secured to said driving shaft, pistons in said cylinders and adapted to be operated by said cam, a connecting conduit between said cylinders, fluid in said cylinders and said connecting conduit and means for controlling the flow of the fluid between said cylinders in order to control the rate of rotation of the said cage with respect to the said driving shaft.

2. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, an annular cam having an outwardly sloping operative surface secured to said driving shaft, pistons in said cylinders, piston rods to said pistons, conical rollers at the ends of said piston rods engaging with said outwardly sloping surface of said annular cam whereby the pistons are operated, a connecting conduit between said cylinders, fluid in said cylinders and said connecting conduit and means for controlling the flow of the fluid between said cylinders in order to control the rate of rotation of the said cage with respect to the said driving shaft.

3. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for moving said sleeve in order to cause the port in the said sleeve to be moved into and out of register with said connecting conduit, pistons in said cylinders operatively connected with said driving shaft, fluid in said cylinders and said connecting conduit, said sleeve by its movement being adapted to control the flow of the fluid between the said cylinders in order to control the rate of rotation of the said cage with respect to said driving shaft.

4. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for moving said sleeve in order to cause the port in the said sleeve to be moved into and out of register with said connecting conduit, pistons in said cylinders, an annular cam secured to said driving shaft and adapted to operate said pistons, fluid in said cylinders and said connecting conduit, said sleeve by its movement being adapted to control the flow of the fluid between the said cylinders in order to control the rate of rotation of the said cage with respect to said driving shaft.

5. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for moving said sleeve in order to cause the port in the said sleeve to be moved into and out of register with said connecting conduit, an annular cam having an outwardly sloping operative surface secured to said driving shaft, pistons in said cylinders, piston rods to said pistons, conical rollers at the ends of said piston rods engaging with said outwardly sloping operative surface of said annular cam, whereby the pistons are operated, fluid in said cylinders and said connecting conduit, said sleeve by its movement being adapted to control the flow of the fluid between the said cylinders in order to control the rate of rotation of the said cage with respect to said driving shaft.

6. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for rotating said sleeve comprising an annular ring journalled about said driving shaft, means for imparting axial movement to said ring, means for converting said axial movement of said ring into radial movement which is applied to the sleeve to rotate the same in order to cause the port in the said sleeve to be moved into and out of register with said connecting conduits, pistons in said cylinders operatively connected with said driving shaft, fluid in said cylinders and said connecting conduit, said sleeve by its movement being adapted to control the flow of the fluid between the said cylinders in order to control the rate of rotation of the said cage with respect to said driving shaft.

7. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for rotating said sleeve comprising an annular ring journalled about said driving shaft, means for imparting axial movement to said ring, means for converting said axial movement of said ring into radial movement which is applied to the sleeve to rotate the same in order to cause the port in the said sleeve to be moved into and out of register with said connecting conduit, pistons in said cylinders, an annular cam secured to said driving shaft and adapted to operate said pistons, fluid in said cylinders and said connecting conduit, said sleeve by its movement being adapted to control the flow of the fluid between the said cylinders in order to control the rate of rotation to the said cage with respect to said driving shaft.

8. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, means for rotating said sleeve comprising an annular ring journalled about said driving shaft, means for imparting axial movement to said ring, means for converting said axial movement of said ring into radial movement which is applied to the sleeve to rotate the same in order to cause the port in the said sleeve to be moved into and out of register with said connecting conduit, pistons in said cylinders, conical rollers at the ends of said piston rods engaging with said outwardly sloping operative surface of said annular cam, fluid in said cylinders, and said connecting conduit, said sleeve by its movement being adapted to control the flow of the fluid between the said cylinders in order to control the rate of rotation of the said cage with respect to said driving shaft.

9. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, pistons in said cylinders operatively connected with said driving shaft, a connecting conduit between said cylinders, fluid in said cylinders and said connecting conduit and means for controlling the flow of the fluid between said cylinders in order to control the rate of rotation of the said cage with respect to the said driving shaft, and means for holding said cage against rotation in order to give a reverse motion.

10. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for moving said sleeve in order to cause the port in the said sleeve to be moved into and out of register with said connecting conduit, pistons in said cylinders operatively connected with said driving shaft, fluid in said cylinders and said connecting conduit, said sleeve by its movement being adapted to control the flow of the fluid between the said cylinders in order to control the rate of rotation of the said cage with respect to said driving shaft, and means for holding said cage against rotation in order to give a reverse motion.

11. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, a connecting conduit between said cylinders, means for rotating said sleeve comprising an annular ring journalled about said driving shaft, means for imparting axial movement to said ring, means for converting said axial movement of said ring into radial movement which is applied to the sleeve to rotate the same in order to cause the port in the said sleeve to be moved into and out of register with said connecting conduit, pistons in said cylinders operatively connected with said driving shaft, fluid in said cylinders and said connecting conduit, said sleeve by its movement being adapted to control the flow of the fluid between the said cyilnders in order to control the rate of rotation of the said cage with respect to said driving shaft, and means for holding said cylinders against rotation in order to give a reverse motion.

12. A variable speed gear comprising a driving shaft and a driven shaft, a pinion secured to said driving shaft, an annular toothed ring secured to said driven shaft, planet pinions engaging with said pinion and said annular toothed ring, a cage for said planet pinions, cylinders carried by said cage, a sleeve inside one of said cylinders having a port, means for rotating said sleeve comprising an annular ring journalled about said driving shaft, means for imparting axial movement to said ring, means for converting said axial movement of said ring into radial movement which is applied to the sleeve to rotate the same in order to cause the port in the said sleeve to be moved into and out of register with said connecting conduit, pistons in said cylinders, an annular cam secured to said driving shaft and having an outwardly sloping operative surface, piston rods to said pistons, conical rollers at the ends of said piston rods engaging with said outwardly sloping operative surface of said annular cam, fluid in said cylinders, and said connecting conduit, said sleeve by its movement being adapted to control the flow of the fluid between the said cylinders in order to control the rate of rotation of the said cage with respect to said driving shaft, and means for holding said cylinders against rotation in order to give a reverse motion.

13. A variable speed gearing comprising a driving shaft and a driven shaft, a pinion secured to said driving shaft, an annular toothed ring secured to said driven shaft, planet pinions engaging with said pinion and said annular toothed ring, a cage for said planet pinions, a drum secured to said cage, cylinders carried by said drum, a sleeve rotatably mounted in one of said cylinders and having a port, pistons in said cylinders, piston rods to said pistons, conical rollers at the ends of said piston rods, an annular cam secured to the driving shaft and having an outwardly sloping annular surface to engage said conical rollers to operate the said pistons in said cylinders, a connecting conduit between said cylinders, fluid in said cylinders and in said connecting conduit, a ring on said driving shaft, means for moving said ring axially with respect to said driving shaft, means for applying this axial movement of the ring as a rotary movement to the said sleeve in order to cause the port in the said sleeve to be moved into and out of register with the connecting conduit in order to control the flow of fluid in said connecting conduit and means for holding said drum against rotation in order to obtain a reverse motion.

14. A variable speed gearing comprising a driving shaft and a driven shaft, a pinion secured to said driving shaft, an annular toothed ring secured to said driven shaft, planet pinions engaging with said pinion and said annular toothed ring, a cage for said planet pinions, a drum secured to said cage, cylinders carried by said drum, a sleeve rotatably mounted in one of said cylinders and having a port, pistons in said cylinders, piston rods to said pistons, conical rollers at ends of said piston rods, an annular cam secured to the driving shaft and having an outwardly sloped annular surface to engage said conical rollers to operate the said pistons in said cylinders, a connecting conduit between said cylinders, fluid in said cylinders and in said connecting conduit, a ring on said driving shaft, a sliding bar, means for operating said sliding bar, a cam projection on said sliding bar, a bell crank lever adapted to be engaged by said cam projections in order to move said ring axially with respect to the driving shaft, means for applying this axial movement of the ring as a rotary movement to the said sleeve in order to cause the port in the said sleeve to be moved into and out of register with the connecting conduit in order to control the flow of fluid in said connecting conduit, an external contracting brake surrounding said drum, a pivoted member adapted to be operated by said sliding bar in order to cause the said external contracting brake to be applied to the drum in order to hold the same against rotation, the cam projection on said sliding bar being so arranged that the external contracting band brake does not come into operation until after the cam projection has passed throughout the whole length of its operative travel.

15. A variable speed gearing comprising a driving shaft and a driven shaft, a pinion secured to said driving shaft, an annular toothed ring secured to said driven shaft, planet pinions engaging with said pinion and said annular toothed ring, a cage for said planet pinions, a drum secured to said cage, cylinders carried by said drum, a sleeve rotatably mounted in one of said cylinders and having a port, pistons in said cylinders, piston rods to said pistons, conical rollers at the ends of said piston rods, an annular cam secured to the driving shaft and having an outwardly sloped annular surface to engage said conical rollers to operate the said pistons in said cylinders, a connecting conduit between said cylinders, fluid in said cylinders and in said connecting conduit, a ring on said driving shaft, a sliding bar, means for operating said sliding bar, a cam projection on said sliding bar, a bell crank lever adapted to be engaged by said cam projections in order to move said ring axially with respect to the driving shaft, a stirrup pivotally mounted at its ends on said ring, a link connected to said stirrup, guides on said drum in which said link slides, a lever pivotally mounted on said drum and adapted to be engaged by said link in order to rock the said lever about its pivot, a spindle on said sleeve, a lever arm on said spindle, a link connecting said lever arm with said pivoted lever whereby the axial movement of said ring is converted into rotary movement of said sleeve in order to cause the port in the said sleeve to be moved into and out of register with the connecting conduit in order to control the flow of fluid in said connecting conduit, a further cam projection on said sliding bar, an external contracting brake surrounding said drum, a pivoted member adapted to be operated by said sliding bar in order to cause the said external contracting brake to be applied to the drum in order to hold the same against rotation, the cam projection on said sliding bar being so arranged that the external contracting band brake does not come into operation until after the cam projection has passed throughout the whole length of its operative travel.

In testimony whereof I have signed my name to this specification.

ERIC RICHARDSON.